United States Patent [19]

Takahashi et al.

[11] 4,244,413
[45] Jan. 13, 1981

[54] SOLID TIRE AND WHEEL ASSEMBLY FOR VEHICLE MOVING THROUGH A TUBULAR CONDUIT

[75] Inventors: Takuya Takahashi, Odawara; Masayoshi Iijima, Yokohama; Norio Ishikawa, Yokosuka, all of Japan

[73] Assignee: Bridgestone Tire Company Limited, Tokyo, Japan

[21] Appl. No.: 913,273

[22] Filed: Jun. 7, 1978

[30] Foreign Application Priority Data

Jun. 10, 1977 [JP] Japan ................................. 52-68511

[51] Int. Cl.³ .......................... C08F 8/42; B60C 7/00
[52] U.S. Cl. ...................................... 152/323; 260/5; 260/23.7 M; 260/31.2 MR; 301/63 PW; 525/193; 525/196; 525/237; 525/264; 525/301; 525/310
[58] Field of Search .................. 152/323; 301/63 PW; 260/31.2 MR, 23.7 M, 5; 525/264, 310, 301, 237, 193, 196

[56] References Cited

U.S. PATENT DOCUMENTS

| | | |
|---|---|---|
| 3,926,873 | 12/1975 | Aishima et al. ................ 260/23.7 M |
| 3,928,270 | 12/1975 | South .............................. 260/23.7 M |
| 4,046,947 | 9/1977 | Brodie ..................................... 260/5 |
| 4,071,279 | 1/1978 | Chung ............................ 301/63 PW |
| 4,117,036 | 9/1978 | Honda et al. ........................ 525/301 |
| 4,134,927 | 1/1979 | Tomoshige et al. ................ 525/301 |

*Primary Examiner*—William F. Hamrock
*Attorney, Agent, or Firm*—Sughrue, Rothwell, Mion, Zinn and Macpeak

[57] ABSTRACT

A solid tire and wheel assembly for vehicle moving through a tubular conduit having excellent abrasion resistance particularly excellent uneven wear resistance is produced by forming a composition layer composed of (a) a diene elastomer, (b) α,β-ethylenically unsaturated carboxylic acid, (c) a divalent metal compound and (d) an organic peroxide on the outer circumferential surface of the metal rim of the wheel and curing said layer by heating.

9 Claims, 2 Drawing Figures

SOLID TIRE AND WHEEL ASSEMBLY FOR VEHICLE MOVING THROUGH A TUBULAR CONDUIT

BACKGROUND OF THE INVENTION

1. Field of the Invention

The present invention relates to a solid tire and wheel assembly for vehicle moving through a tubular conduit which is propelled by pressured air flow.

2. Description of the Prior Art

In general, when the abrasion resistance is demanded in the field as the solid tire and wheel assembly for vehicle moving through a tubular conduit wherein the carrying load is large, the diameter of wheel is small and the drive feeling is sacrificed, solid tires made of urethane rubber have been used. However, the use of urethane rubber has the problems in the high cost of the starting materials and in the uneven wear, so that the development of novel materials having a high abrasion resistance, which can substitute for urethane rubber has been demanded.

SUMMARY OF THE INVENTION

An object of the present invention is to provide a solid tire and wheel assembly for vehicle moving through a tubular conduit having excellent abrasion resistance, particularly excellent uneven wear resistance.

The present invention relates to a solid tire and wheel assembly for vehicle moving through a tubular conduit, which is obtained by forming a composition layer composed of (A) a diene elastomer, (B) an $\alpha,\beta$-ethylenically unsaturated carboxylic acid, wherein the ratio by weight of the component (A) to the component (B) is 87/13 to 55/45, (C) a divalent metal compound being present in quantities of 50 to 150 parts by weight per 100 parts by weight of the component (B), and (D) an organic peroxide being present in quantities of 0.3 to 5.0 parts by weight per 100 parts by weight of the combined weight of the components (A) and (B) on the outer circumferential surface of a metal rim of the wheel and curing said layer by heating.

Furthermore, the present invention relates to a solid tire and wheel assembly for vehicle moving through a tubular conduit, which is obtained by forming a composition layer composed of (A) a diene elastomer, (B) an $\alpha,\beta$-ethylenically unsaturated carboxylic acid, wherein the ratio by weight of the component (A) to the component (B) is 87/13 to 55/45, (C) a divalent metal compound being present in quantities of 50 to 150 parts by weight per 100 parts by weight of the component (B), (D) an organic peroxide being present in quantities of 0.3 to 5.0 parts by weight per 100 parts by weight of the combined weight of the components (A) and (B), and (E) an unpolymerizable carboxylic acid or a metal salt of the unpolymerizable carboxylic acid being present in quantities of 1.5 to 17 parts by weight per 100 parts by weight of the component (A) on the outer circumferential surface of a metal rim of the wheel and curing said layer by heating.

DESCRIPTION OF THE PREFERRED EMBODIMENT

Figure 1:
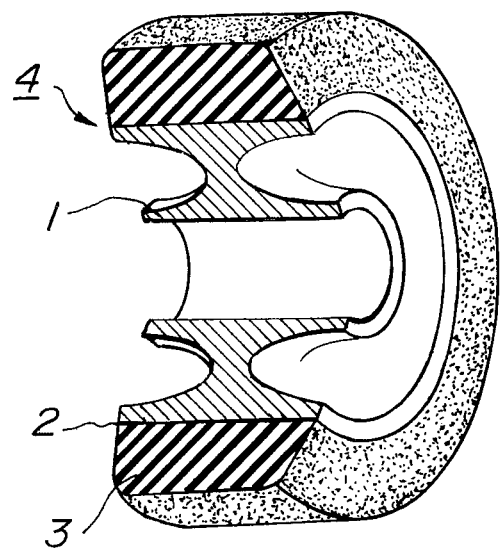
FIG. 1 is a perspective view partly in section of a solid tire and wheel assembly for vehicle moving through a tubular conduit of the present invention.
Figure 2:
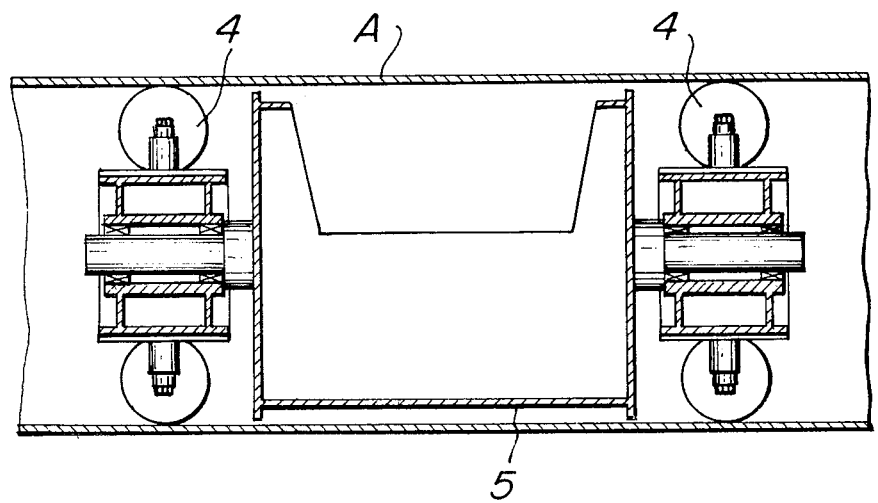
FIG. 2 is a sectional view illustrating a vehicle fitted with the solid tire and wheel assembly shown in FIG. 1.

The solid tire and wheel assembly for vehicle moving through a tubular conduit according to the present invention uses the composition obtained by compounding (A) a diene elastomer, (B) an $\alpha,\beta$-ethylenically unsaturated carboxylic acid, (C) a divalent metal compound and (D) an organic peroxide in the particularly defined amounts or the composition obtained by further adding the particularly defined amount of an unpolymerizable carboxylic acid thereto, as the material for the solid tire.

The diene elastomers used in the practice of the invention as the component (A) may include natural rubber, homopolymers of conjugated dienes, such as 1,3-butadiene, isoprene, chloroprene and the like, and copolymers of the conjugated dienes with alkenyl aromatic compounds, such as styrene, $\alpha$-methylstyrene, vinyltoluene and the like, mixtures of these homopolymers and/or copolymers and mixture of these homopolymers or copolymers and non-diene rubbers, such as isoprene-isobutylene copolymer ethylene-propylene based terpolymers, and the like. Especially, homopolymers of 1,3-butadiene and isoprene, that is butadiene rubber (abbreviated as BR hereinafter), and isoprene rubber, and styrene-butadiene copolymers (styrene-butadiene rubber) are preferably used. Cis-1,4-configuration in these diene homopolymers is preferably more than 30 percent by weight. Cis-1,4-polybutadiene is most preferable.

The $\alpha,\beta$-ethylenically unsaturated carboxylic acids used in the invention as the component (B) may include methacrylic acid, ethacrylic acid, acrylic acid, cinnamic acid, crotonic acid, maleic acid, fumaric acid, itaconic acid, and the like. Methacrylic acid is preferably used. The weight ratio of the component (A) to the component (B) should be in the range of 87/13 to 55/45. The rubber compositions including the component (A) of more than the specified range are impractical because of its lower hardness. The compositions including the component (A) of less than the specified range are, on the contrary, too hard and brittle for the practical usage.

The divalent metal compounds used in the invention as the component (C) may include oxides, hydroxides and carbonates of zinc, magnesium, calcium, iron, cobalt and the like. Zinc oxide, especially activated zinc oxide is preferably used. The component (C) should be employed in quantities enough to neutralize all the carboxyl groups in the component (B). The amount of the component (C), thus may be changeable according to the kind of the component (B), a species of metal or the form of metal compound; the component (C) may be generally employed in quantities of 50 to 150 parts by weight per 100 parts by weight of the component (B). When the component (C) is compounded in a too large amount, especially, the elongation at break decreases.

The organic peroxides used in the invention as the component (D) may include dialkyl peroxides exemplified as below; dicumyl peroxide (abbreviated as DCP hereinafter), di-t-butyl peroxide, 2,5-dimethyl-2,5-di-t-butylperoxy hexane, α,α'-bis-t-butylperoxy-p-diisopropylbenzene, 1,1-di-t-butylperoxy-3,3,5-trimethylcyclohexane and the like. Dicumyl peroxide is generally used. The component (D) may be generally employed in quantities of 0.3 to 5.0 parts by weight per 100 parts of the combined weight of the components (A) and (B). Because when the amount is less than 0.3% by weight, the Young's modulus of the rubber composition is too low, while when the amount is more than 5.0% by weight. The Young's modulus is too high and both the cases are not preferable in view of the properties.

In the second aspect of the present invention, the component (E) of the unpolymerizable carboxylic acids is compounded to the components (A)–(D) but the component (E) is carboxylic acids which are not polymerized by the component (D), for example the saturated aliphatic carboxylic acids, such as acetic acid, butyric acid, lauric acid, palmitic acid, stearic acid, and the like, higher unsaturated aliphatic carboxylic acids, such as oleic acid and the like, alicyclic carboxylic acids, such as naphthenic acid and aromatic carboxylic acids, such as benzoic acid. When these free carboxylic acids are added, the breaking properties, such as breaking strength and elongation at break and flexing fatigue resistance are improved. The component (E) is added in an amount of 1.5–17% by weight based on the component (A). When the amount is less than 1.5% by weight, the above described breaking properties and the flexing fatigue resistance are not substantially improved, while the amount is too large, the hardness of the composition after curing decreases.

In the present invention, carbon black, if necessary, may be added to the above described components and any of channel black and furnace black for rubber may be used. For example, easy processing channel (EPC), medium processing channel (MPC), fine furnace (FF), high modulus furnace (HMF), semireinforcing furnace (SRF), superabrasion furnace (SAF), intermediate superabrasion surface (ISAF), intermediate superlow structure (ISAFLS), intermediate superhigh structure (ISAF-HS), high abrasion furnace (HAF), high abrasion furnace low structure (HAF-LS), high abrasion furnace high structure (HAF-HS), first extruding furnace (FEF), general purpose furnace (GPF), conductive furnace (CF) and the like may be used. By addition of carbon black, the weather resistance of the product is improved.

A method for manufacturing the solid tire and wheel assembly for vehicle moving through a tubular conduit according to the present invention will be explained with reference to the drawings.

As shown in FIG. 1, the bonding surface 1 of metal rim for the wheel is roughened by a sand blast or an acid treatment, if necessary an well known adhesive is coated thereon, and the above described composition 3 previously thoroughly mixed by any mixing process, such as roll is wound around the outer circumferential surface of the metal rim in a sheet form having a more or less larger breadth than the breadth of the metal rim so as to obtain a given diameter. Then, the metal rim wound with the above described rubber composition is heated in a mold to cure said rubber composition to obtain the solid tire and wheel assembly 4 for vehicle moving through a tubular conduit. The above mentioned production process relies upon the rubber molding process but the solid tire and wheel assembly can be manufactured by transfer molding or wrapping cure. In the above described production step, the curing temperature is 110°–180° C. When the curing temperature is lower than 110° C., a long time is needed for the curing and when the curing temperature is higher than 180° C., the crack resistance of the rubber composition becomes poor.

The rubber of the thus obtained solid tire has a hardness of 70–95 degree in JIS hardness and this value is suitable for the stability upon moving.

The solid tire and wheel assemblies according to the present invention are fitted on a vehicle 5 and are used for moving in the tubular conduit A. The solid tire and wheel assembly according to the present invention is noticeably superior in the abrasion resistance and the uneven wear resistance to the conventional wheel using a solid tire made of urethane rubber and is low in the travelling noise and further is low in the cost of the starting material and is very great in the utilizing value.

The following examples are given for the purpose of illustration of this invention and are not intended as limitations thereof. In the examples, "part" means by weight.

The process for evaluating the solid tire and wheel assembly is as follows.

A. Travelling condition:

A vehicle in which the load applied to the wheel is adjusted to 125 kg per one wheel in a straight line was reciprocatively driven until travelling 10,000 km at a rate of 28 km/hr. The size of the solid tire and wheel assembly was 178 mm in the outer diameter and 50 mm in the breadth.

B. Abrasion resistance:

The evaluation was made by the decrease of the thickness of the rubber layer of the wheel after travelling 10,000 km.

C. Uneven weared amount:

A top end of a dial gauze was set at the ground contact area of the solid tire and wheel assemblies prior to travelling and after travelling 10,000 km and the evaluation was made by the difference of the maximum value and the minimum value of the dial gauze shown by the pointer when the solid tire and wheel assembly was moved one revolution. The smaller this value, the smaller the uneven weared amount is.

D. Travelling noise:

The noise amount generated during travelling was measured by a noise measuring apparatus at a place of 1 m distanced from the tube wall.

EXAMPLE 100 parts of polybutadiene containing 98% of cis-1,4 bond (made by Japan Synthetic Rubber Co. Trademark: BR01), 20 parts of HAF black, 2.5 parts of stearic acid, 15 parts of zinc oxide, 20 parts of methacrylic acid and 1.5 parts of dicumyl peroxide were thoroughly mixed by rolls to form a sheet. Such a sheet was wound around the metal rim of the wheel having a diameter of 148 mm and a breadth of 50 mm so that the outer diameter becomes about 178 mm. The assembly was charged in a mold and heated at 140° C. for 30 minutes to form the solid tire and wheel assembly for vehicle moving through a tubular conduit. The results of the travelling test are shown in the following table.

COMPARATIVE EXAMPLE

A bonding surface of a metal rim of a wheel was subjected to a sand blast treatment and then applied with a commercially available adhesive and the wheel was set in a mold. A mixture of 100 parts of polyetherurethane polymer (made by Nippon Polyurethane Co. Trademark: CORONATE 4090) previously heated at 80°-100° C. and 13 parts of 4,4'-methylene-bis (2-chloroaniline) heated at about 110° C. was rapidly introduced into the mold and the mold was heated at 100° C. for 3 hours to cure the mixture. The results of the travelling test are shown in the following Table 1.

TABLE 1

|  | Example | Comparative Example |
| --- | --- | --- |
| Weared amount (mm) | 1.1 | 3.5 |
| Uneven weared amount (mm) |  |  |
| Prior to travelling | 0.2 | 0.5 |
| After travelling | 0.1 | 1.0 |
| Travelling noise (digital) | 64~66 | 73~75 |

Note:
The background noise of circumstance was 43~45 digital.

As seen from the result in the above Table 1, the solid tire and wheel assembly for vehicle moving through a tubular conduit of the present invention is superior in the abrasion resistance to the conventional solid tire and wheel assembly made of urethane rubber and the uneven wear due to travelling does not occur. Furthermore, the travelling noise is low, so that the deterioration of circumstance due to the noise can be prevented to the minimum limit.

What is claimed is:

1. A solid tire and wheel assembly for vehicle moving through a tubular conduit obtained by forming a composition layer composed of
    (A) a diene elastomer consisting mainly of cis-1,4-polybutadien
    (B) an $\alpha,\beta$-ethylenically unsaturated carboxylic acid, wherein the ratio by weight of component (A) to component (B) is 87/13 to 55/45,
    (C) a divalent metal compound selected from the group consisting of one or more of zinc oxide, zinc hydroxide and zinc carbonate present in quantities of 50 to 150 parts by weight per 100 parts by weight of the component (B); which quantity is sufficient to neutralize all carboxyl groups present in component (B), and
    (D) a dialkyl peroxide present in quantities of 0.3 to 5.0 parts by weight per 100 parts by weight of the combined weight of components (A) and (B) on the outer circumferential surface of a metal rim of the wheel and adhering and curing said layer on said metal rim by heating at 100° to 180° C.

2. The solid tire and wheel assembly as claimed in claim 1, wherein said $\alpha,\beta$-ethylenically unsaturated carboxylic acid is methacrylic acid.

3. The solid tire and wheel assembly as claimed in claim 1, wherein said divalent metal is zinc oxide.

4. The solid tire and wheel assembly as claimed in claim 1, wherein said dialkyl peroxide is dicumyl peroxide.

5. A solid tire and wheel assembly for a vehicle moving through a tubular conduit obtained by forming a composition layer composed of
    (A) a diene elastomer consisting mainly of cis-1,4-polybutadiene,
    (B) an $\alpha,\beta$-ethylenically unsaturated carboxylic acid, wherein the ratio by weight of component (A) to component (B) is 87/13 to 55/45,
    (C) a divalent metal compound selected from the group consisting of one or more of zinc oxide, zinc hydroxide and zinc carbonate present in quantities of 50 to 150 parts by weight per 100 parts by weight of component (B), which quantity is sufficient to neutralize all carboxyl groups present in component (B),
    (D) a dialkyl peroxide present in quantities of 0.3 to 5.0 parts by weight per 100 parts by weight of the combined weight of components (A) and (B), and
    (E) an unpolymerizable fatty acid present in quantities of 1.5 to 17 parts by weight per 100 parts by weight of the component (A) on the outer circumferential surface of a metal rim of the wheel and adhering and curing said layer on said metal rim by heating at 100° to 180° C.

6. The solid tire and wheel assembly as claimed in claim 1 which further comprises polyisoprene.

7. The solid tire and wheel assembly as claimed in claim 1 which further comprises natural rubber.

8. The solid tire and wheel assembly of claim 5 which further comprises polyisoprene.

9. The solid tire and wheel assembly of claim 5 which further comprises natural rubber.

* * * * *